United States Patent
Kobayashi

[15] 3,675,944
[45] July 11, 1972

[54] APPARATUS FOR ATTACHING A FRONT-WHEEL FORK TO A HEAD PIPE IN A TWO-WHEELED VEHICLE OR THE LIKE

[72] Inventor: Yozaburo Kobayashi, Tokyo, Japan
[73] Assignee: Honda Giken Kogyo Kabushiki Kaisha, Tokyo, Japan
[22] Filed: Dec. 16, 1969
[21] Appl. No.: 885,531

[30] Foreign Application Priority Data
Dec. 16, 1968 Japan.................................43/109803

[52] U.S. Cl..............................280/278, 280/514, 287/100, 280/287
[51] Int. Cl......................................................B62k 15/00
[58] Field of Search.................280/278, 279, 276, 280, 504, 280/514, 515, 287; 287/100; 74/89.15

[56] References Cited
UNITED STATES PATENTS

| | | |
|---|---|---|
| 3,513,926 | 5/1970 | Paget...................................280/279 X |
| 668,546 | 2/1901 | Sutherland..............................280/279 |
| 3,398,983 | 8/1968 | Olsson...............................280/515 X |
| 3,432,214 | 3/1969 | Cashman et al....................287/100 X |
| 3,507,516 | 4/1970 | Fritz.......................................280/279 |
| 3,015,498 | 2/1962 | Tanaka et al. .........................280/278 |

FOREIGN PATENTS OR APPLICATIONS

| | | |
|---|---|---|
| 93,626 | 12/1896 | Germany...............................280/278 |
| 6,291,183 | 7/1944 | Netherlands..........................280/278 |
| 647,705 | 10/1962 | Italy.......................................280/287 |
| 512,578 | 7/1952 | Belgium................................280/279 |

Primary Examiner—Benjamin Hersh
Assistant Examiner—John P. Silverstrim
Attorney—Waters, Roditi, Schwartz & Nissen

[57] ABSTRACT

A front-wheel fork of a two-wheel vehicle carries upper and lower bridge members adapted for detachably engaging opposite ends of a core end projecting from a head pipe. The bridge members have central openings with lateral grooves in which the ends of the rod can be introduced and removed, and selectively locked by means of positioning members on the rod which engage in the central openings and interlock with the bridge members.

9 Claims, 7 Drawing Figures

INVENTOR
BY Gozaburo Kobayashi

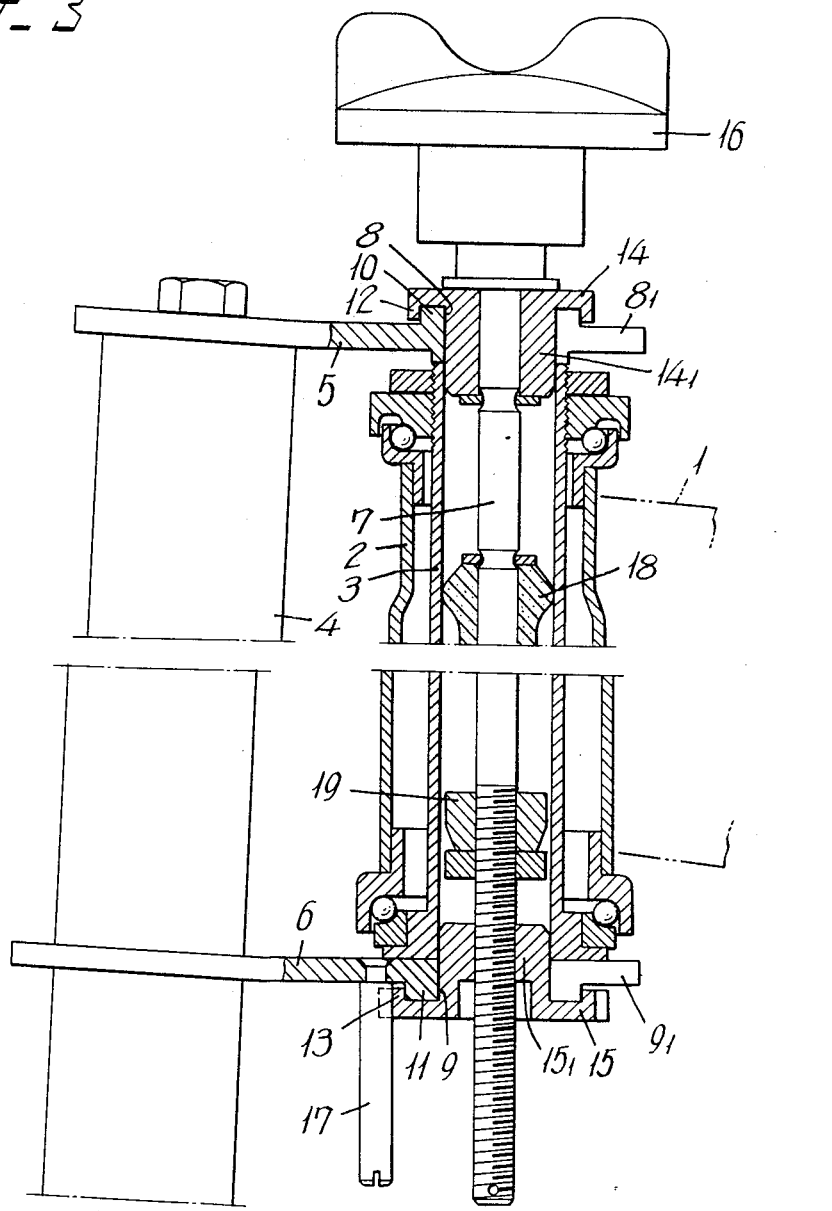

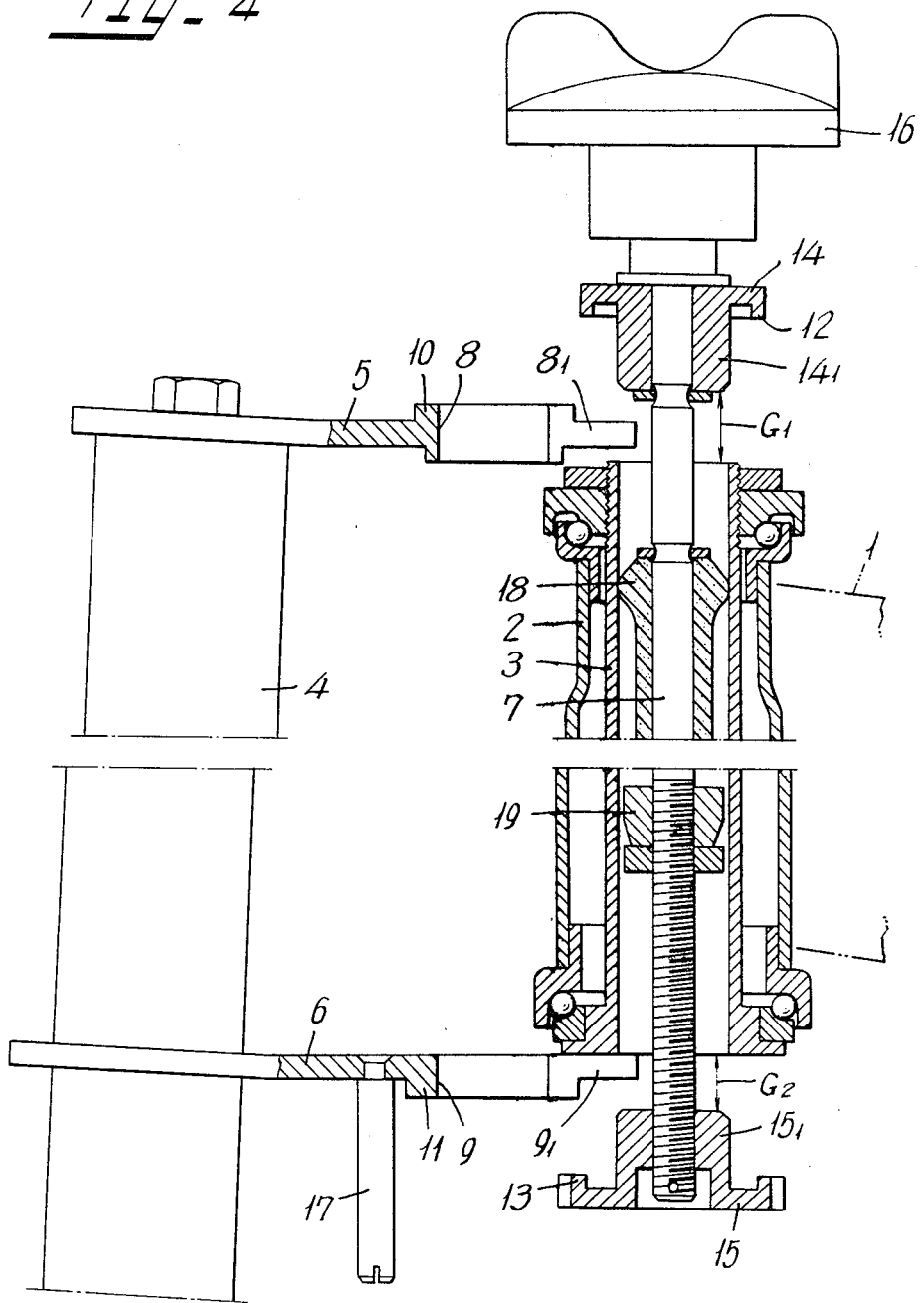

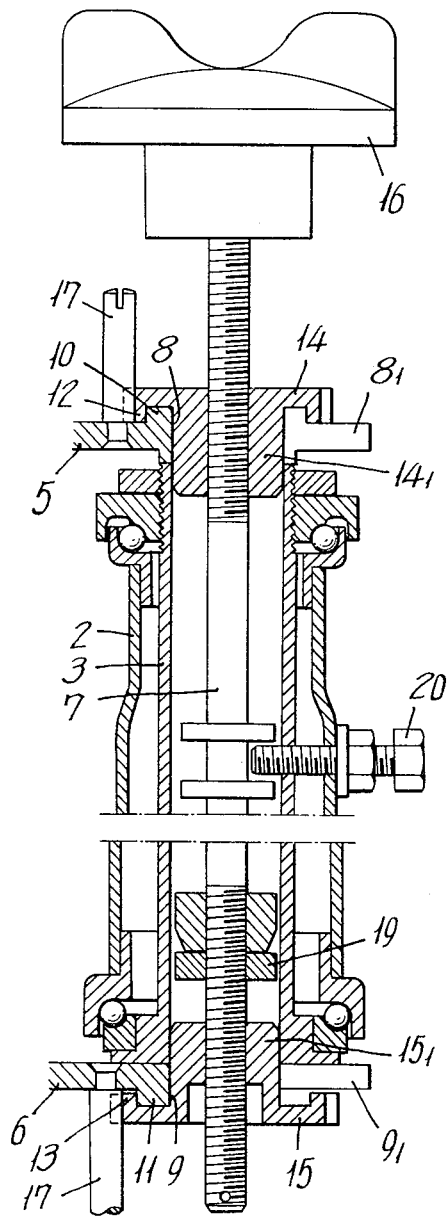
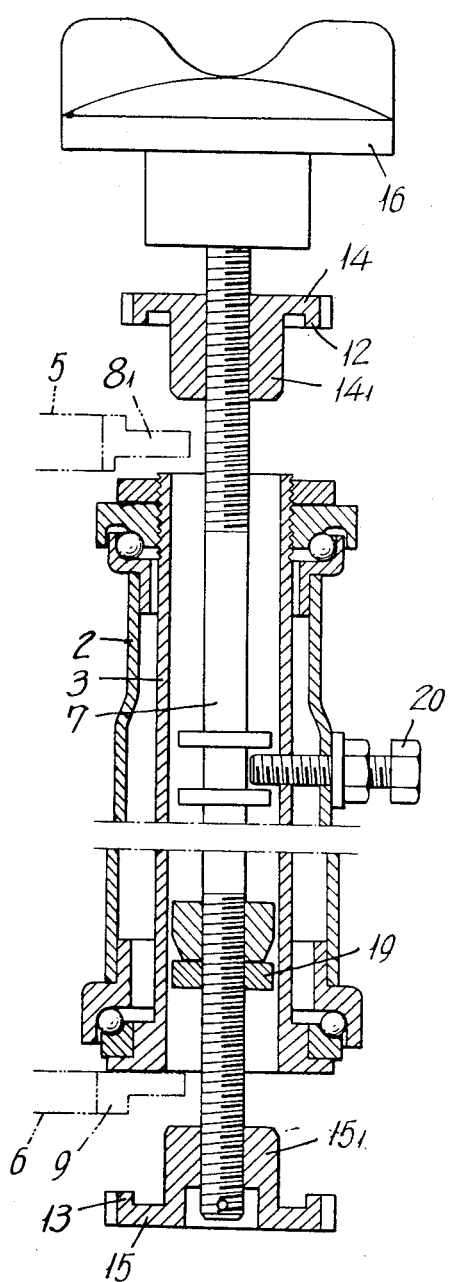

3,675,944

APPARATUS FOR ATTACHING A FRONT-WHEEL FORK TO A HEAD PIPE IN A TWO-WHEELED VEHICLE OR THE LIKE

BRIEF SUMMARY OF THE INVENTION

This invention relates to apparatus for attaching a front-wheel fork to a frame body of a vehicle such as a bicycle, motorcycle, motor-tricycle or the like.

An object of the invention is to provide apparatus of the above noted type which makes attaching and detaching possible without requiring any tool or the like. Thus it becomes convenient to carry the fork and body separately in a motorcar such as in the trunk thereof and to assemble the parts where the motorcar can no longer travel, and then transfer to the assembled vehicle.

According to the invention there is provided attachment apparatus for a front-wheel fork and a head pipe of a two-wheeled vehicle or the like which apparatus comprises a steering stem in the head pipe including a core rod having opposite projecting ends, upper and lower bridge members on the fork with respective central openings and lateral grooves opening externally thereof for the sideways introduction and removal of the projecting ends of the core rod into said openings and positioning members on the core rod engageable in said openings for securing said stem in the bridge members, said positioning members and bridge members including interlocking means for holding the members together when the positioning members and bridge members are secured together.

BRIEF DESCRIPTION OF THE DRAWING

FIG. 3 is a longitudinal sectional view of the apparatus according to this invention in assembled condition, FIG. 4 is a longitudinal sectional view of the apparatus in disassembled condition, FIG. 5 is a longitudinal sectional view of a modified embodiment in assembled condition, FIG. 6 is a longitudinal sectional view of the modified embodiment in disassembled condition.

DETAILED DESCRIPTION

Figure 1:
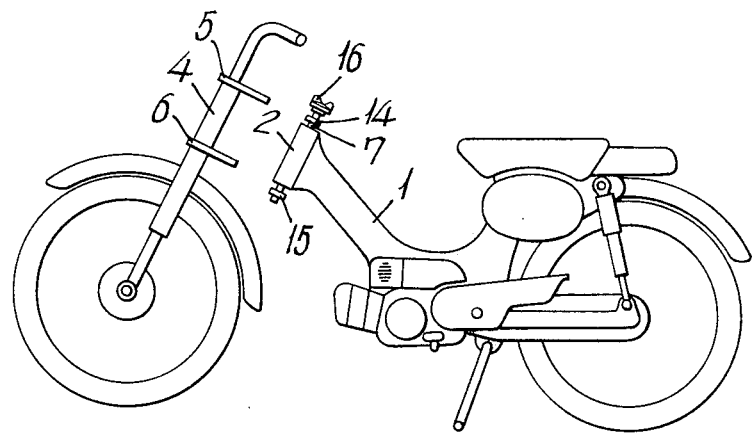
FIG. 1 is a side view of a motorcycle, in disassembled state with the apparatus according to the invention employed thereby.
Figure 2:
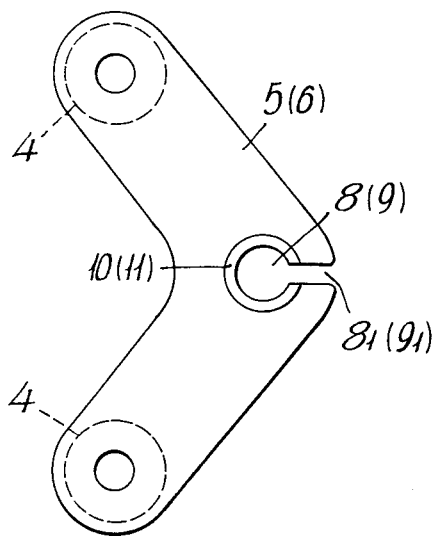
FIG. 2 is a top plan view of a bridge member of a fork portion thereof.

Referring to the drawing, numeral 1 denotes a frame body of a two-wheeled vehicle or the like frame body 1 carries a head pipe 2 in which is engaged a steering stem 3. Numeral 4 denotes a front-wheel fork which carries upper and lower bridge members 5 and 6 respectively. The steering stem 3 receives a core rod 7 with ends projecting upwardly and downwardly from stem 3. The core rod 7 is inserted sideways into central openings 8, 9 in the bridge members 5, 6 through grooves $8_1$, $9_1$ so that the bridge members 5, 6 may be applied onto the upper and lower opposite ends of the steering stem 3, whereafter positioning members $14_1, 15_1$ on the core rod 7 are engaged in the central openings 8, 9 of the bridge members 5, 6 so that the bridge members 5, 6 may be connected to the steering stem 3.

With this construction, by moving the positioning members $14_1, 15_1$ slightly along the core rod 7 or together with the core rod 7 in the longitudinal direction, the engagement with the central openings 8, 9 of the bridge members 5, 6 can be released, and the bridge members 5, 6 and the steering stem 3 can be introduced or removed sideways through the grooves $8_1, 9_1$. Accordingly, connection and disconnection between the frame body 1 and the front-wheel fork 4 can be easily and rapidly effected by merely tightening and loosening the positioning members $14_1$, $15_1$ in relation to the bridge members 5, 6. As a means for tightening and loosening of the positioning members $14_1, 15_1$, a screw or cam mechanism is suitable.

The frame body 1 and the front-wheel fork 4 are connected together, at the central openings 8, 9 of the bridge members 5, 6, through the positioning members $14_1, 15_1$ mounted therein, and the openings 8,9 are of comparatively large diameter so that the connecting portions have high rigidity. The positioning members $14_1, 15_1$ cannot pass through the grooves $8_1$, $9_1$ after being engaged, so that the connection between the frame body 1 and the front-wheel fork 4 cannot come apart once engaged.

To increase the rigidity of the connecting portion between the bridge members 5, 6 and the positioning members $14_1$, $15_1$, the bridge members 5, 6 are provided at the peripheral edges of the central openings 8, 9 with outwardly directing projecting walls 10, 11, while the positioning members $14_1$, $15_1$ are provided with flange portions 14, 15, having annular projecting walls 12, 13 which engage with the outer surfaces of the projecting walls 10,11 when the positioning members $14_1, 15_1$ are mounted in the openings 8, 9. The bridge members 5, 6 are subject to the formation of stress concentrations caused by the grooves $8_1, 9_1$, and the presence of the projecting walls 10, 11 at the peripheral edges of the openings 8, 9 serve as a reinforcement. Moreover grooves $8_1$, $9_1$ are prevented from widening by means of the inner and outer engagement between the projecting walls 10, 12 and 11, 13, and thus there is no reduction in the rigidity of the bridge members 5, 6.

The core rod 7 supporting the positioning members $14_1, 15_1$ may comprise separate upper and lower elements, but in the illustrated embodiments the rod is a single tubular element passing vertically through the hollow interior of the steering stem 3. Collars 18, 19 each having an outer diameter nearly equal to the inner diameter of the steering stem 3 are attached to the core rod 7 within the hollow interior.

The core rod 7 is held in coaxial relationship within the steering stem 3 by the collars 18, 19 and, at the same time, the positioning members $14_1, 15_1$ are kept in coaxial relationship with the steering stem 3 to facilitate mounting and assembling of the positioning members $14_1, 15_1$ not only in the openings 8, 9 of the bridge members 5, 6 but also in the opposite ends of the steering stem 3.

If, as illustrated in FIGS. 3 and 4, at least one of the collars 18, 19 is made of a resilient material such as rubber, synthetic resin, or the like, to produce a frictional engagement with the inner surface of the steering stem 3, the core rod 7 is free to rotate and move up and down but will not fall off, so that after the frame body 1 and the front-wheel fork 4 have been separated one from another, the positioning members $14_1, 15_1$ which have been moved along the core rod 7 for such separation can be retained at the displaced positions. Accordingly, the positioning members $14_1, 15_1$ are not required to be corrected in their up and down positions upon the next assembling, and the bridge members 5, 6 can be readily and easily applied to the upper and lower ends of the steering stem 3.

In the illustrated embodiment of FIGS. 3 and 4, one of the positioning members, i.e. the member $14_1$ is attached to rod 7 so as to be rotatable but longitudinally immovable with respect thereto, while the other member, i.e. member $15_1$ is threaded onto rod 7. The rod 7 is provided with an operation handle 16, and the member $15_1$ is locked against rotation in relation to the bridge member 6 by means of a pin 17. If, in FIG. 3, the handle 16 on rod 7 is turned, the positioning member $15_1$ moves along the pin 17 for separation from the bridge member 6, whereafter the core rod 7 can be moved upward in a direction opposite to the travel of the positioning member $15_1$, so that there are formed spaces $G_1$, $G_2$ between the positioning members $14_1, 15_1$ and the end surfaces of the steering stem 3 as shown in FIG. 4, whereby the bridge members 5, 6 can be removed by sideways movement through the grooves $8_1, 9_1$. The construction can be so modified that the core rod 7 is not rotatable in relation to the bridge member while the positioning member $15_1$ is rotated by the handle.

Thus, tightening and loosening of the positioning members $14_1, 15_1$ for engaging and disengaging the bridge members can be effected solely by the rotation of the handle 16 and the slight longitudinal sliding movement thereof, without requiring a tool. Hence, the connecting and disconnecting operations between the frame body 1 and the front-wheel fork 4 are simple.

In the illustrated embodiment of FIGS. 5 and 6, the positioning members $14_1$, $15_1$ are attached to the opposite ends of the core rod 7 by means of right and left handed threads and the members $14_1$, $15_1$ are locked so as not to be rotatable in relation to the bridge members 5, 6. The core rod 7 is held against upward and downward movement by a member 20. By rotation of the core rod 7, the positioning members $14_1$, $15_1$ can be simultaneously tightened and loosened for engagement and disengagement respectively in relation to the bridge members 5, 6, and the connecting and the disconnecting operations between the frame body 1 and the front-wheel fork 4 can be effected at high efficiency because engaging and disengaging can be made in half the number of rotations of that in the embodiment of FIGS. 3 and 4.

Figure 7:
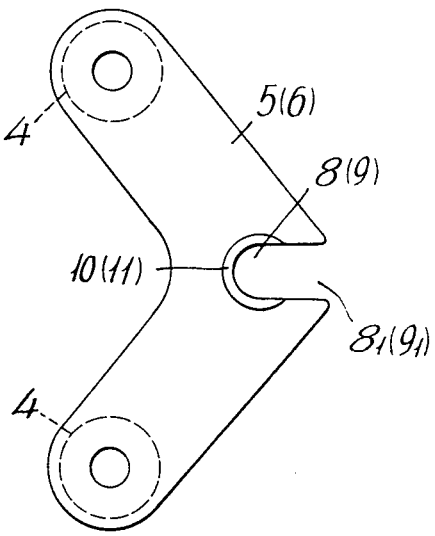
FIG. 7 is a plan view of a modified bridge member.

Additionally, the bridge member can be modified as shown in FIG. 7. Namely, the width of the grooves $8_1$, $9_1$ can be made equal to the diameter of the central openings 8,9. With the bridge members thus constructed, it becomes unnecessary, on disassembling, to move the positioning members $14_1$, $15_1$ such a distance that they are entirely out of the central openings 8, 9, and it is only necessary to move the members 14, 15, such that the engagement between the projecting walls 10, 11 and the projecting walls 12, 13 is released. Thus the engagement and disengagement operations are simplified.

What is claimed is:

1. Attachment apparatus for a front wheel fork and a head pipe of a two-wheeled vehicle or the like, said apparatus comprising a steering stem positioned rotatably in the head pipe, a core rod in said stem and including opposite projecting ends, upper and lower bridge members on the fork with respective central openings and lateral grooves opening externally thereof for the sideways introduction and removal of the projecting ends of the core rod into and from said openings, and including projecting walls at least partly encircling said openings, and positioning members on the core rod engageable in said openings in the bridge members and in the stem for adjustably sandwiching the bridge members axially against said stem with the bridge members being spaced from said head pipe, said positioning members and bridge members including interlocking means for holding the members together against lateral displacement when the positioning members and bridge members are juxtaposed.

2. Apparatus as claimed in claim 1 wherein said interlocking means comprises a flange on each positioning member with an annular projecting wall thereon, for engaging the walls on the bridge members.

3. Apparatus as claimed in claim 2 wherein the groove in each bridge member has a width which is smaller than the diameter of the central opening thereof.

4. Apparatus as claimed in claim 2 wherein the groove in each bridge member has a width substantially equal to the diameter of the central opening therein.

5. Apparatus as claimed in claim 1 wherein the core rod supporting the positioning members is constituted as a single rod passing vertically through the steering stem, said apparatus further comprising collars on said rod each having an outer diameter substantially equal to the inner diameter of the steering stem and attached to the rod within the steering stem to position the rod coaxially in the stem.

6. Apparatus as claimed in claim 5 wherein at least one of the collars is in frictional engagement with the inner surface of the steering stem.

7. Apparatus as claimed in claim 1 wherein said core rod is constituted as a single rod passing vertically through the steering stem, at least one of said positioning members being threadably engaged on said rod, such that by rotation of either the core rod or the positioning member threaded thereon the positioning member can be axially displaced along the rod.

8. Apparatus as claimed in claim 7 wherein the other of the positioning members is secured to the rod for rotation thereon while being longitudinally immovable with respect to the rod.

9. Apparatus as claimed in claim 1 comprising means for holding the core rod rotatably in said stem and longitudinally immovable, said positioning members being threadably engaged on the opposite ends of the core rod by right and left handed threads so as to be simultaneously engaged and disengaged with respect to the central openings of the bridge members by turning the core rod.

* * * * *